(No Model.) 2 Sheets—Sheet 1.
S. ROBINSON.
HUB ATTACHING DEVICE.
No. 515,842. Patented Mar. 6, 1894.
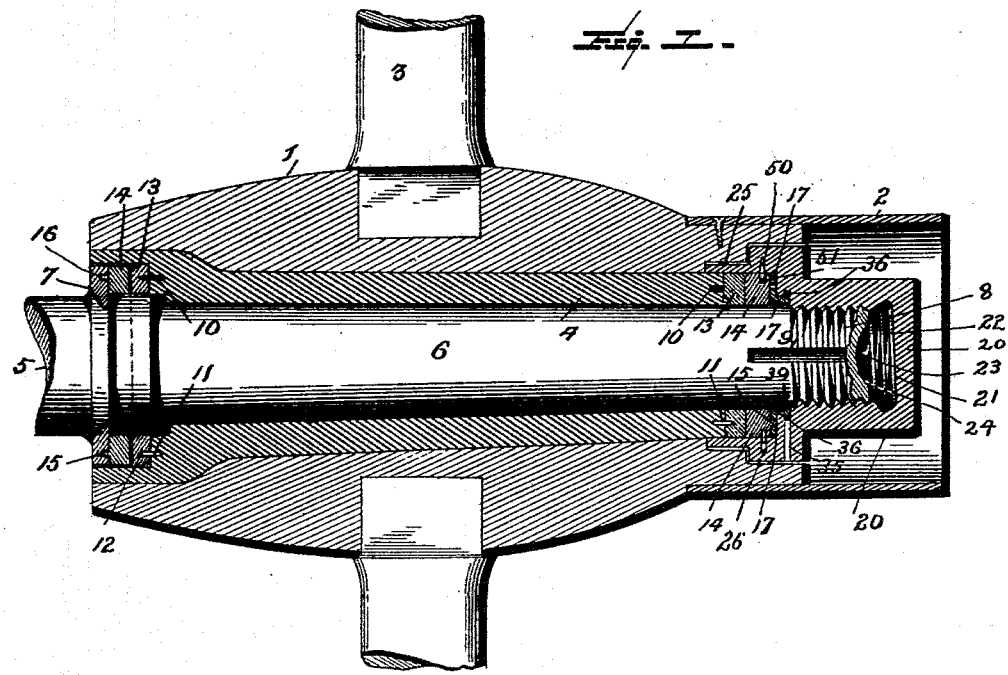
Fig. 1.
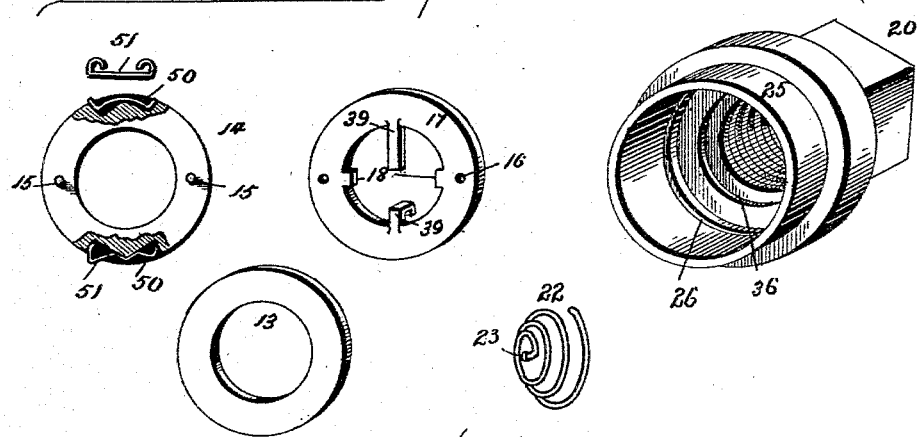
Fig. 2.
Fig. 3.
Witnesses:
L. C. Hills
J. H. Jochum Jr.
Inventor:
Samuel Robinson,
by Collamer & Co.,
Attorneys.

(No Model.) 2 Sheets—Sheet 2.
S. ROBINSON.
HUB ATTACHING DEVICE.
No. 515,842. Patented Mar. 6, 1894.
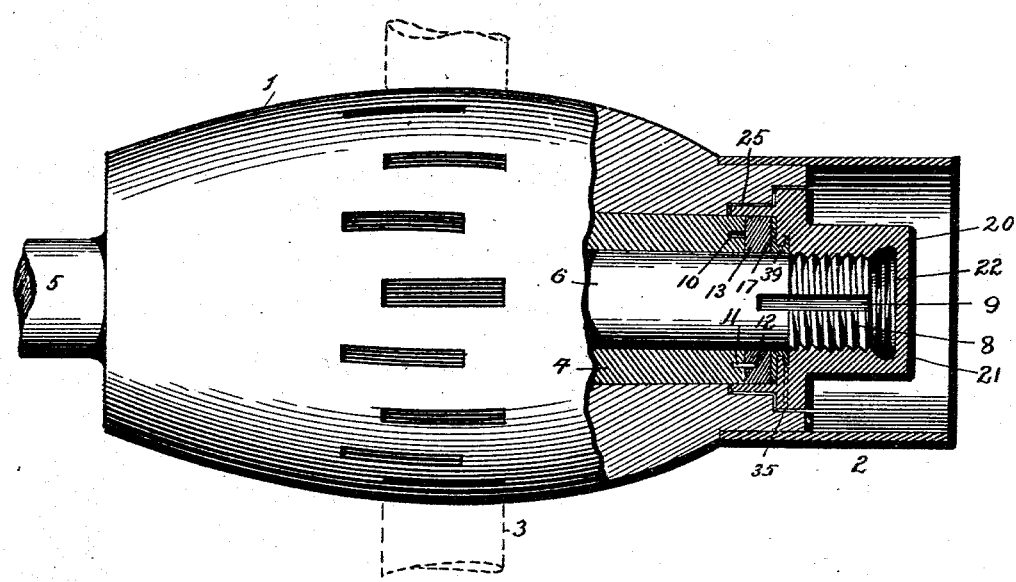
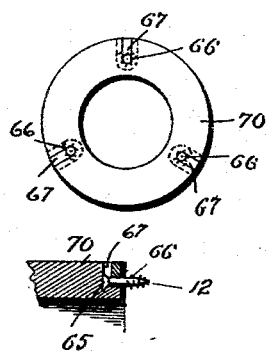
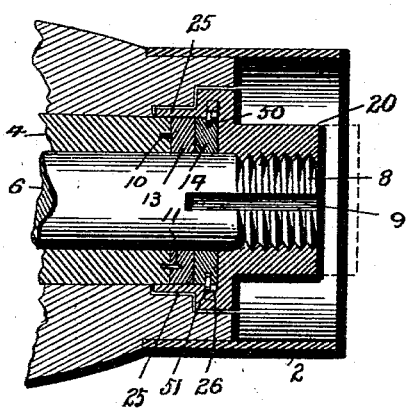
Witnesses:
L. C. Hills
J. H. Jochum Jr.
Inventor:
Samuel Robinson,
by Collamer
Attorneys

UNITED STATES PATENT OFFICE.

SAMUEL ROBINSON, OF MONMOUTH, ILLINOIS.

HUB-ATTACHING DEVICE.

SPECIFICATION forming part of Letters Patent No. 515,842, dated March 6, 1894.

Application filed May 13, 1893. Serial No. 474,082. (No model.)

*To all whom it may concern:*

Be it known that I, SAMUEL ROBINSON, a citizen of the United States, and a resident of Monmouth, Warren county, State of Illinois, have invented certain new and useful Improvements in Hub-Attaching Devices; and my preferred manner of carrying out the invention is set forth in the following full, clear, and exact description, terminating with claims particularly specifying the novelty.

This invention relates to carriages and wagons, and more especially to that class thereof known as hub-attaching devices; and the object of the same is to produce an improved device of this character which will throw all the wear on the meeting faces of a leather washer secured to the hub-boxing and a friction plate or washer adjacent this washer.

A further object is to provide an improved nut lock capable of use in this connection for preventing the nut from turning off the end of the axle-spindle.

To this end the invention consists in the construction hereinafter more fully described, and as illustrated in the drawings, wherein—

Figure 1 is a central longitudinal section of a hub and spindle with my attaching devices in place. Fig. 2 shows in detached perspective detail the parts illustrated in Fig. 1. Fig. 3 is a sectional detail of a slightly modified construction of friction plate within the nut cavity. Fig. 4 is a detail showing my preferred manner of attaching the pins or spuds to the ends of the hub boxing. Fig. 5 is a sectional view of the outer end of a hub showing the nut connected with the spindle through the friction plate only. Fig. 6 is a similar view showing the nut connected with the spindle through the friction washer only.

It is well known that hubs are ordinarily held on axle-spindles by means of nuts screwed onto the threaded extremities of said spindles by means of right and left hand screws at the opposite sides of the vehicle—the arrangement being such that the forward progress of the vehicle tends to tighten the nuts, but if the vehicle be backed for a considerable distance, or if it be driven forward over a rough road the nuts may come loose and drop off. The reason for this has been that heretofore the outer end of the hub or hub boxing revolved in direct contact with the nuts or with an ordinary washer placed between them, but which soon wore out.

In the present invention I contemplate the attachment of leather washers to the ends of the hub boxing and the interposition of a friction plate, or friction washer, or both, between the outermost leather washer and the nut, as well as the provision of means for preventing the rotation of the friction plate or washer and a nut lock between the plate or washer and the nut, so as to positively prevent the rotation of the latter. The accompanying drawings and the following specification explain my manner of carrying out this idea.

In the said drawings the numeral 1 designates a wooden hub having the usual sand band 2 and spokes 3, and 4 is the usual metallic hub-boxing which is secured within the aperture in the hub.

5 is the axle having the usual spindle 6 which rotates within the boxing 4, and 7 is the enlarged shoulder at the inner end of the spindle.

8 is the threaded outer extremity of the spindle, and 9 designates one or more recesses or grooves cut through the threads longitudinal of the spindle, although these recesses could be replaced by one or more flattened sides of the spindle without departing from the spirit of my invention.

In each end of the boxing are formed a number of holes 10 standing parallel with the axis, and 11 are screws, tacks, pins, spuds, or other articles of sufficient hardness and size which are seated in these holes or sockets with their roughened and pointed extremities 12 extending slightly beyond the ends of the boxing and embedding leather washers 13 which are driven onto these points in any suitable manner—the construction being such that the leather washers shall be firmly locked to the boxing and caused to turn therewith as the hub revolves. In Fig. 4 I have illustrated a slight modification of the manner of attaching these spuds to the ends of the hub-boxing. In this case the hub-boxing 70 is provided in its end with radial notches 67 of dovetailed cross section, and the spuds 66 have enlarged heads 65 adapted to closely fit such notches. The heads are passed into the notches and the spuds pressed toward the center of the boxing, after which the leather washers may be driven onto the barbed or roughened points 12 of the spuds, or blocks or plugs might be driven into the outer ends of the notches—either of which would prevent the lateral dislocation of the spuds. It will be seen that the latter cannot be drawn out of the notches by a longitudinal movement, although they can be withdrawn by a radial movement when it is desired to sharpen or replace them. Next outside these leather washers are located the friction plates 14 which are of washer-shape with flat faces abutting against the adjacent flat faces of the leather washers 13. As the wear-points are thus between the leather-washers 13 and the friction plates 14, some means must be provided to prevent the plates from rotating; and with this end in view I provide pins or studs 15 projecting from the innermost plate 14 and engaging holes or cavities 16 in the shoulder 7, while the outermost friction plate is shown in Fig. 1 as similarly connected by pins and cavities with a washer 17 mounted on the spindle just outside this friction plate. This washer may be of the construction shown in Fig. 2, where it is provided with the holes or cavities 16 as well as with lugs 18 projecting into its opening and adapted to engage the recesses 9 in the spindle so as to prevent the washer from rotating on the spindle; or the plate itself and the pins and cavities may be omitted and the washer will serve as the friction plate as shown in Fig. 5.

It will be clear from the description below that either form of washer can be used as well as one of considerably different shape, and also that a greater or less number of pins might be employed or that the pins might be on the washer and the cavities in the friction plate—all without departing from the spirit of my invention. Thus it will be seen that when the parts are assembled the shoulder 7 is locked to the innermost friction plate, and the latter is stationary while the adjacent leather washer revolves against it; and the washer 17 is locked upon the spindle and the outermost friction plate to this washer, while the adjacent leather washer revolves against this friction plate, or against the washer itself which constitutes the friction plate when applied alone.

20 is a nut having a threaded opening of a size to take onto the threads 8 of the spindle, and the outer end of this nut is preferably closed as at 21.

22 is a tension spring coiled in a conical shape so that its convolutions are capable of being nested when the spring is pressed together, and the outer or larger convolution stands within and against the closed outer end 21 of the nut 20 while the tip of the inner or smaller convolution is turned out as at 23 and stands in a small socket or cavity 24 in the end of the spindle. The tension of the spring thus holds the nut frictionally against unscrewing from the threaded end of the spindle, and hence it constitutes a tension spring with which I may employ the nut lock elsewhere shown and hereinafter described. The inner end of this nut 20 has a tubular extension or cup 25 fitting around the washer 17, the friction plate, the leather washer, and the outer extremity of the boxing; while between this cup 25 and the body of the nut 20 the latter is formed with an enlarged interiorly corrugated annular cavity 26 as shown in Fig. 3. The bottoms of the corrugations stand outward toward the surface of the cup 25, while the tops of the corrugations stand in a circle somewhat larger than the friction plate 14 in order that the latter may be passed into the cup. In the edge of this plate 14 at one or more suitable points are formed W-shaped sockets 50 in which are seated the nut-locking springs 51 shown in Fig. 2, or those of slightly different construction, 52, shown in Fig. 3, which have eyes 53 at their extremities as illustrated. The center of each spring rests on the angle of the W in the socket, while its extremities or the eyes thereat are borne normally outward into the corrugated cavity 26. I might here state that in certain instances the corrugations could be omitted and this cavity 26 be plain, but I prefer the corrugations to engage the extremities of the springs as shown. In the constructions illustrated in Figs. 1 and 5, these nut locking springs engage the cavity 26 and permit the nut to be turned manually by the exercise of considerable force, sufficient to bend the extremities of the spring so as to pass them from one corrugation to another, but they prevent the automatic turning of the nut. In Fig. 1 the friction plate 14 is connected by the pins 15 with the friction washer 17, and the latter is prevented by its lugs 18 from turning on the spindle; whereas in Fig. 5 (where the friction washer is omitted) the friction plate 14 will possess the lugs 18 as seen in Fig. 3, and these lugs by engaging the recesses 9 of the spindle will prevent the friction plate from turning: hence when the friction plate is connected by the nut lock with the nut, the latter will be prevented from turning in either construction. Within the body of the nut is further formed a smooth annular chamber 36 somewhat larger than the threaded opening and preferably located adjacent the inner end thereof with a small hole 35 communicating with this chamber through one of the faces of the nut. The washer 17, has at points preferably quartering to the lugs 18, tongues 39 normally projecting into the spindle-opening and adapted to be bent into the inner end of the nut and their tips then bent outward within said annular chamber 36—this construction preventing the washer from revolving on the spindle but allowing the nut to so revolve while its chamber 36 moves around the tongues 39 so as to keep the nut and washers always in engagement. When it is desired to remove the washer from the nut, the tongues are brought successively under the hole 35 and are bent out straight by inserting a suitable tool through said hole and driving on the outer end of the tool. The above described swivel connection between the friction washer and the nut could, however, be omitted in certain instances, when a very cheap hub attaching device indeed would be produced, and one which is applicable to almost any hub now in use by simply providing the threaded portion of the spindle with the recesses 9. In this case the arrangement of parts would be nearly that shown in Fig. 6, but the friction washer 17 would not have the tongues 39 although it would have the lugs 18. The latter would prevent the rotation of the washer which is induced by the turning of the leather washer 13 against it, and the tension spring 22 in the closed outer end 21 of the nut would be sufficient to prevent the nut from rotating under all ordinary circumstances.

With the above construction the operation of assembling the parts of this device is as follows: The innermost friction plate 14 is passed onto the spindle and its pins engaged with the cavities in the shoulder 7. The spuds are seated in the ends of the boxing and the leather washers driven onto their points. The boxing is then passed onto the spindle until the innermost leather washer strikes against the innermost friction plate. The friction washer is then passed through the cup of the nut and its tongues bent into the chamber thereof so as to provide the swivel connection between this washer and the nut. The outermost friction plate is then dropped into the cup and its pins engaged with the cavities in the friction washer. In order to drop the friction plate into the cavity the nut locking spring or springs 52 must be bent in as shown in dotted lines in Fig. 3, and when the pin and cavities engage it will be obvious that the extremities of the nut locking springs will fly outward into the corrugated cavity 26. The tension spring is then seated in the outer end of the nut, and the nut passed over and onto the threaded end of the spindle—the lugs of the friction washer being caused to engage the recesses 9 in the spindle. As the nut is screwed onto the threads, the washer and the friction plate are, of course, caused to move inward along the spindle without revolving, and finally when the nut has been screwed home the tension spring is compressed as shown in Fig. 1 and the outermost friction plate and leather washer are in close contact. Thereafter when the wheel revolves the wear will be between the friction plates 14 and the leather washers 13; and when the spindle (which is tapering as shown) has become worn and it is desired to press the boxing farther inward thereon, a thinner friction plate, or leather washer, or both, may be substituted for those here shown at the inner end of the hub.

In Fig. 5 the operation is practically the same as above described, except that the friction washer is here omitted and the lugs 18 are formed integrally with the friction plate 14.

In Fig. 6 the plate is omitted while the washer is present, and the inner face of the washer itself here constitutes the friction plate having a wearing surface against which the leather washer 13 revolves.

I do not confine myself to the exact details of construction herein shown and described, as considerable change may be made therein without departing from the spirit of my invention. It is not necessary that the leather washer and friction plate be used at both ends of the hub, and it is not always necessary that a nut lock of any character be used. The relative sizes, shapes, and materials of parts are not essential except that the washers 13 are preferably of leather or analogous substance, and the friction plates 14 are preferably of metal or analogous substance.

What is claimed as new is—

1. The combination with a hub having holes in the ends of its boxing, spuds seated in said holes and having projecting pointed extremities, and leather washers driven onto said extremities; of friction plates of washer-shape having flat faces bearing against the outer flat faces of said washers, and means for holding said flat faces in contact and for preventing said plates from rotating, substantially as described.

2. The combination with a hub having in the ends of its boxing radial notches of dovetailed cross section, spuds having enlarged heads removably fitting said notches, and pointed and roughened extremities projecting longitudinally from the end of the boxing, and leather washers driven onto said extremities; of friction plates of washer-shape having flat faces bearing against the outer flat faces of said washers, and means for holding said flat faces in contact and for preventing said plates from rotating, substantially as described.

3. The combination with a hub having soft washers secured to the ends of its boxing, a spindle within said boxing and having a shoulder at the inner end thereof provided with cavities, and a nut at the outer end of the spindle; of a friction plate of washer-shape abutting against the innermost soft washer, and pins projecting from said plate and detachably engaging the cavities in said shoulder, substantially as described.

4. The combination with a hub having soft washers at the ends of its boxing, and a spindle journaled within said boxing and having a threaded extremity with a longitudinal recess through the threads; of a friction plate abutting against the outermost soft washer, a lug connected with said plate and engaging the recess for preventing the rotation of the plate, a nut screwed on said threads for preventing the axial dislocation of the plate, said nut having an interior annular groove, a swivel connection between the plate and groove, and a spring substantially as described for preventing the unscrewing of the nut, as set forth.

5. The combination with a spindle having a threaded extremity and a longitudinal recess through the threads, a box journaled on said spindle, and a soft washer adjacent the end of the box; of a friction plate mounted on the spindle adjacent said washer, a lug connected with said plate and engaging the recess for preventing the rotation of the plate, a nut screwed on the threads and having an annular cavity, and a nut locking spring connected with the plate and adapted to engage said cavity, as and for the purpose set forth.

6. The combination with a spindle having a threaded extremity and a longitudinal recess through its threads, a box journaled on the spindle, a friction plate adjacent the end of the box, a lug connected with said plate and engaging the recess for preventing the rotation of the plate, and a radial nut locking spring seated in the outer edge of said plate; of a nut screwed onto the threads and having a cup-shaped inner end embracing said plate, the nut also having an interior cavity between its threaded opening and cup with which cavity said nut locking spring engages when the parts are assembled, as and for the purpose set forth.

7. The combination with a spindle, a box journaled thereon, a friction plate mounted on the spindle adjacent the end of the box and provided with a W-shaped socket in its periphery, and means for preventing the rotation of said plate; of a nut screwed onto the outer end of the spindle and having a cup-shaped inner end embracing said plate, the nut furthermore having an interior radial cavity between its threaded portion and cup, and a nut locking spring seated in said socket and engaging said cavity when the parts are assembled, as and for the purpose set forth.

8. The combination with a spindle, a box journaled thereon, a friction plate mounted on the spindle adjacent the end of the box and provided with a W-shaped socket in its periphery, and means for preventing the rotation of said plate; of a nut screwed onto the outer end of the spindle and having a cup-shaped inner end embracing said plate and the outer end of the boxing, and the nut furthermore having between its threaded portion and said cup an interior corrugated cavity whose smallest circumference is larger than that of the plate, and a nut locking spring seated in said socket with its center resting on the angle of the W and its extremities borne normally outward into the corrugations of said cavity when the parts are assembled, as and for the purpose set forth.

9. The combination with a spindle, a nut screwed thereon and having a smooth annular interior chamber of greater size than its threaded opening, a washer having radially projecting parts loosely engaging said chamber, and means for preventing the rotation of the washer; of a friction plate mounted on the spindle adjacent said washer, and means for connecting the washer and plate to prevent the rotation of the latter, substantially as described.

10. The combination with a spindle, a nut screwed thereon and having a smooth annular interior chamber of greater size than its threaded opening, a washer having radially projecting parts loosely engaging said chamber, and means for preventing the rotation of the washer; of a friction plate mounted on the spindle adjacent said washer, and pins projecting from said plate and engaging cavities in the washer, to prevent the rotation of the plate as and for the purpose set forth.

11. The combination with a spindle, a nut screwed thereon and having a smooth annular interior chamber of greater size than its threaded opening, a washer having radially projecting parts loosely engaging said chamber, and means for preventing the rotation of the washer; of a friction plate mounted on the spindle adjacent said washer, means for connecting the washer and plate to prevent the rotation of the latter, and a spring for preventing the rotation of the nut, substantially as described.

12. The combination with a spindle, a nut screwed thereon and having a smooth annular interior chamber of greater size than its threaded opening, a washer having radially projecting parts loosely engaging said chamber, and means for preventing the rotation of the washer; of a friction plate mounted on the spindle adjacent said washer, means for connecting the washer and plate to prevent the rotation of the latter, said nut having an interior cavity, and a nut locking spring mounted in said friction plate and engaging said cavity when the parts are assembled, as and for the purpose set forth.

13. The combination with a spindle, a nut screwed on the threads of the spindle and having a smooth annular interior chamber of greater size than its threaded opening, with a hole leading from said chamber outward through one of the flat faces of the nut; of a friction washer mounted on the spindle and having tongues bent into the inner end of the nut and then outward into said chamber, means for preventing the washer from revolving on the spindle, a friction plate adjacent the washer, and means for connecting the plate and washer, as and for the purpose set forth.

14. The combination with a spindle having a longitudinal recess through its threads, and a nut screwed on the threads and having a smooth annular interior chamber of greater size than its threaded opening; of a friction washer mounted on the spindle and having tongues bent into the inner end of the nut and then outward into said chamber, a lug in the opening of the washer engaging said recess for preventing the washer from revolving on the spindle, a friction plate adjacent the washer, and means for connecting the plate and washer, as and for the purpose set forth.

15. The combination with a spindle having a longitudinal recess through its threads, and a nut screwed on the threads; of a friction washer mounted on the spindle, a lug in the opening of the washer engaging said recess for preventing the washer from revolving on the spindle, a swivel connection between said lug and nut, a friction plate adjacent the washer, and means for connecting the plate and washer, as and for the purpose set forth.

16. The combination with a spindle having a longitudinal recess through its threads, and a nut screwed on the threads; of a friction washer mounted on the spindle, a lug in the opening of the washer engaging said recess for preventing the washer from revolving on the spindle, a swivel connection between said lug and nut, a friction plate adjacent the washer, means for connecting the plate and washer, and a nut locking spring mounted in a recess in said friction plate and engaging a corrugated cavity within the nut, as and for the purpose set forth.

17. The combination with a hub having soft washers secured to the ends of its boxing, a spindle within said boxing and having a shoulder at the inner end thereof, and a nut at the outer end of the spindle; of a friction plate of washer-shape abutting against the innermost soft washer, and pins and cavities detachably connecting the friction plate and shoulder, substantially as described.

In testimony whereof I have hereunto subscribed my signature on this the 8th day of May, A. D. 1893.

SAMUEL ROBINSON.

Witnesses:
E. J. BLAIR,
GEO. A. SCHUSSLER.